United States Patent
Chen

(10) Patent No.: US 11,709,767 B2
(45) Date of Patent: Jul. 25, 2023

(54) METHOD AND APPARATUS FOR VERIFYING OPERATION STATE OF APPLICATION

(71) Applicant: BEIJING BAIDU NETCOM SCIENCE AND TECHNOLOGY CO., LTD., Beijing (CN)

(72) Inventor: Hua Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 17/117,902

(22) Filed: Dec. 10, 2020

(65) Prior Publication Data
US 2021/0382815 A1 Dec. 9, 2021

(30) Foreign Application Priority Data
Jun. 5, 2020 (CN) .......................... 202010504483.4

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
CPC .................. G06F 11/3684; G06F 11/3688
See application file for complete search history.

(56) References Cited

U.S. PATENT DOCUMENTS 7,320,114 B1 * 1/2008 Jain .................. G06F 11/263
716/139
8,046,639 B1 * 10/2011 Nordin ............ G06F 11/2268
714/33
(Continued)

FOREIGN PATENT DOCUMENTS

| CN | 104699601 A | 6/2015 |
| CN | 106845209 A | 6/2017 |

(Continued)

OTHER PUBLICATIONS

Extended European Search Report dated Jun. 7, 2021 for European Patent Application No. 20212529.0. 9 pages.
(Continued)

*Primary Examiner* — Joshua P Lottich
(74) *Attorney, Agent, or Firm* — Knobbe, Martens, Olson & Bear, LLP

(57) ABSTRACT

A method and an apparatus for verifying an operation state of an application are provided. The method can include setting target verification operation information according to an operation verification item of an application to be verified; setting a verification process instruction for the target verification operation information; encapsulating the verification operation information and the verification process instruction as fault injection data, and sending the fault injection data to a data input port of the application to be verified; matching the process feedback information with the verification process instruction in response to receiving the process feedback information corresponding to the fault injection data, and determining executed target verification operation information.

13 Claims, 6 Drawing Sheets

(56) References Cited

U.S. PATENT DOCUMENTS

| | | | |
|---|---|---|---|
| 9,916,233 B1* | 3/2018 | Qureshi | G06F 9/45533 |
| 10,643,011 B1 | 5/2020 | Nardi et al. | |
| 10,795,793 B1* | 10/2020 | Arunachalam | G06F 11/0709 |
| 2005/0071818 A1* | 3/2005 | Reissman | G06F 11/3672 |
| | | | 717/127 |
| 2010/0251043 A1* | 9/2010 | Anzou | G11C 29/70 |
| | | | 714/719 |
| 2015/0143179 A1* | 5/2015 | Desai | G06F 11/3688 |
| | | | 714/38.1 |
| 2015/0161025 A1 | 6/2015 | Basel et al. | |
| 2017/0103013 A1* | 4/2017 | Grechanik | G06N 5/041 |
| 2017/0192754 A1 | 7/2017 | Bohn et al. | |
| 2017/0242784 A1 | 8/2017 | Heorhiadi et al. | |
| 2018/0060202 A1 | 3/2018 | Papak et al. | |
| 2020/0401506 A1* | 12/2020 | Sathianarayanan | G06F 9/54 |

FOREIGN PATENT DOCUMENTS

| | | |
|---|---|---|
| JP | 2013-218492 | 10/2013 |
| JP | 2015-141539 | 8/2015 |
| KR | 2020-0007133 A | 1/2020 |
| WO | WO 2018/025383 | 2/2018 |

OTHER PUBLICATIONS

Jul. 17, 2022 Korean Office Action from Korean App. No. 9-5-2022-053135502 (6 pgs).

Ezekiel et al., "Combining fault injection and model checking to verify fault tolerance, recoverability, and diagnosability in multi-agent systems", Information and Computation, 2016, http://dx.doi.org/10.1016/j.ic.2016.10.007, 28 pages.

Song et al., "Research on Fault Injection Method of Train MVB Bus", Electric Drive for Locomotives, No. 5, 2019, 5 pages.

* cited by examiner

METHOD AND APPARATUS FOR VERIFYING OPERATION STATE OF APPLICATION

CROSS-REFERENCE TO RELATED APPLICATIONS

This application claims the priority of Chinese Patent Application No. 202010504483.4, titled "METHOD AND APPARATUS FOR VERIFYING OPERATION STATE OF APPLICATION," filed on Jun. 5, 2020, which is incorporated herein by reference in its entirety.

TECHNICAL FIELD

Embodiments of the present disclosure relate to the field of computer technology, and more particularly, to a method and apparatus for verifying an operation state of an application.

BACKGROUND

With the development of information technology, various applications widely used in people's daily life and work, which improves the convenience of people's life and the efficiency of work. During the on-line operation phase of an application, a technician can inject fault data into the application to verify whether the application can continue to operate properly and reliably in certain fault scenarios.

SUMMARY

Embodiments of the present disclosure provide a method and apparatus for verifying an operation state of an application.

According to a first aspect, an embodiment of the present disclosure provides a method for verifying an operation state of an application, the method including: setting target verification operation information according to an operation verification item of an application to be verified, the target verification operation information including a verification operation identification; setting a verification process instruction for the target verification operation information, where the verification process instruction is used for returning the verification operation identification and state information corresponding to the target verification operation information when the to-be-verified application performs data processing on the target verification operation information; encapsulating the verification operation information and the verification process instruction as fault injection data, and sending the fault injection data to a data input port of the application to be verified; and in response to receiving process feedback information corresponding to the fault injection data, matching the process feedback information with the verification process instruction to determine executed target verification operation information.

In some embodiments, the setting target verification operation information according to an operation verification item of an application to be verified includes: extracting feature data of the application to be verified, where the feature data includes at least one of a data processing module included in the application to be verified, a data transmission protocol of the application to be verified, or a data type of the application to be verified; determining target feature data corresponding to the operation verification item from the feature data, the operation verification item including at least one of security verification or fault verification; and setting target verification operation information according to the target feature data, and setting a verification operation identification for the target verification operation information, the target verification operation information including at least one of delay data, error data, a number of instruction requests, or an alarm signal.

In some embodiments, the setting a verification process instruction for the target verification operation information includes executing the verification process instruction at a first set time interval in response to detecting that the application to be verified performs data processing on the target verification operation information.

In some embodiments, the matching the process feedback information with a verification process instruction to determine executed target verification operation information includes: extracting a target verification operation identification from the process feedback information; and matching the target verification operation identification with the verification process instruction, and determining the executed target verification operation information.

In some embodiments, the process feedback information includes log information of the application to be verified, and the method further includes in response to not receiving the process feedback information corresponding to the fault injection data within a second set period, generating a verification report based on historical executed target verification operation information, the state information, and the log information.

According to a second aspect, an embodiment of the present disclosure provides an apparatus for verifying an operation state of an application, the apparatus including: a target verification operation information setting unit configured to set target verification operation information according to an operation verification item of an application to be verified, the target verification operation information including a verification operation identification; a verification process instruction setting unit configured to set a verification process instruction for the target verification operation information, where the verification process instruction is used for returning the verification operation identification and state information corresponding to the target verification operation information when the to-be-verified application performs data processing on the target verification operation information; a verification data encapsulation unit configured to encapsulate the verification operation information and the verification process instruction as fault injection data and send the fault injection data to a data input port of the application to be verified; and a verification unit configured, in response to receiving process feedback information corresponding to the fault injection data, to match the process feedback information with the verification process instruction to determine executed target verification operation information.

In some embodiments, the target verification operation information setting unit includes a feature data extraction subunit configured to extract feature data of the application to be verified, the feature data including at least one of a data processing module included in the application to be verified, a data transmission protocol of the application to be verified, and a data type of the application to be verified; a target feature data determining subunit configured to determine target feature data corresponding to the operation verification item from the feature data, the operation verification item including at least one of security verification or fault verification; and a target verification operation information setting subunit configured to set target verification operation information according to the target feature data, and set a verification operation identification for the target verification operation information, the target verification operation information including at least one of delay data, error data, instruction request times, or an alarm signal.

In some embodiments, the verification process instruction setting unit includes a verification process instruction setting subunit configured to execute the verification process instruction at a first set time interval in response to detecting that the application to be verified performs data processing on the target verification operation information.

In some embodiments, the verification unit includes a target verification operation identification extracting subunit configured to extract a target verification operation identification from the process feedback information; and a target verification operation information determining subunit configured to match the target verification operation identification with the verification process instruction and determine the executed target verification operation information.

In some embodiments, the process feedback information includes log information of the application to be verified, and the apparatus further includes a verification report generating unit configured to generate a verification report based on the historical executed target verification operation information, the state information, and the log information in response to not receiving the process feedback information corresponding to the fault injection data within a second set period.

In a third aspect, an embodiment of the present disclosure provides an electronic device including one or more processors; a memory storing one or more programs, where the one or more programs when executed by the one or more processors cause the one or more processors to perform the method for verifying an operation state of an application in the first aspect.

According to a fourth aspect, an embodiment of the present disclosure provides a computer readable medium storing a computer program, where the program, when executed by a processor, implements the method for verifying an operation state of an application in the first aspect.

According to the method and apparatus for verifying an operation state of an application provided in some embodiments of the present disclosure, first, target verification operation information is set according to an operation verification item of the application to be verified, thereby improving verification pertinence; then a verification process instruction is set for the target verification operation information to facilitate determination of a detection process; then the verification operation information and the verification process instruction are encapsulated into fault injection data, and sending the fault injection data to a data input port of the application to be verified; and finally, in response to receiving the process feedback information corresponding to the fault injection data, the process feedback information is matched with the verification process instruction to determine the executed target verification operation information. The application can detect the operation state of the to-be-verified application after executing the target verification operation, which is beneficial to improving the on-line operation stability of the to-be-verified application.

It is to be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the application.

DETAILED DESCRIPTION OF EMBODIMENTS

Example embodiments of the present disclosure are described below in connection with the accompanying drawings, in which various details of embodiments of the present disclosure are included to facilitate understanding, and are to be considered as examples only. Accordingly, one of ordinary skill in the art will recognize that various changes and modifications may be made to embodiments described herein without departing from the scope and spirit of the present disclosure. Also, for clarity and conciseness, descriptions of well-known functions and structures are omitted from the following description.

Figure 1:
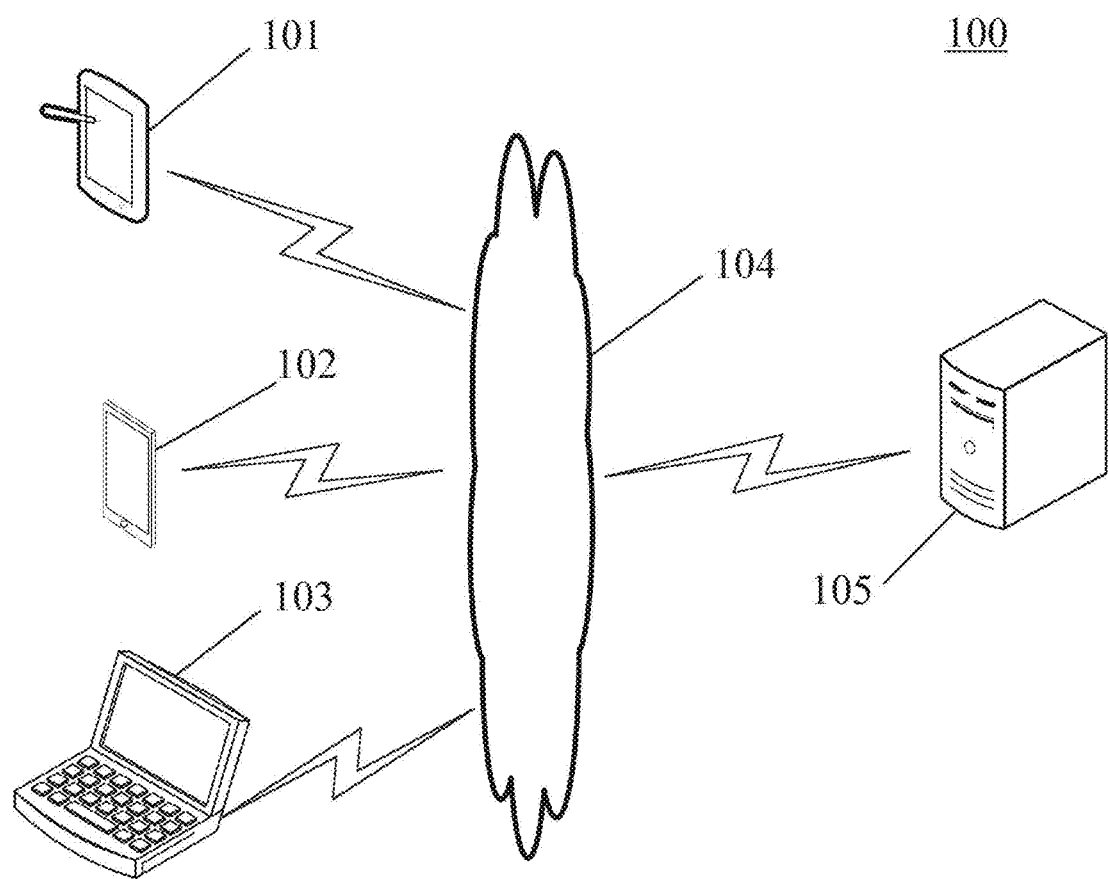
FIG. 1 is a schematic diagram of a first embodiment of the present disclosure.

FIG. 1 illustrates an example system architecture 100, in which a method for verifying an operation state of an application or an apparatus for verifying an operation state of an application according to some embodiments of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The terminal devices 101, 102, 103 interact with the server 105 through the network 104 to receive or transmit messages or the like. Various communication client applications, such as cloud applications, web browser applications, shopping applications, search applications, instant messaging tools, mailbox clients, social platform software, and the like, may be installed on the terminal devices 101, 102, 103.

The terminal devices 101, 102, 103 may be hardware or software. When the terminal devices 101, 102, 103 are hardware, they may be various electronic devices having a display screen and supporting various applications, including but not limited to a smartphone, a tablet computer, an electronic book reader, an MP3 player (Moving Picture Experts Group Audio Layer III), a MP4 (Moving Picture Experts Group Audio Layer IV) player, a laptop portable computer, a desktop computer, and the like. When the terminal devices 101, 102, and 103 are software, they may be installed in the electronic devices listed above. It may be implemented as a plurality of software pieces or software modules (e.g., for providing distributed services) or as a single software piece or software module, which is not specifically limited herein.

The server 105 may be a server providing various services, such as a server performing a test on applications to be verified on the terminal devices 101, 102, 103. The server may set the target detection operation information according to the operation verification item of the application to be verified to test the operation state of the application to be verified on the terminal devices 101, 102, 103.

It should be noted that the method for verifying an operation state of an application provided in some embodiments of the present disclosure is generally performed by the server 105, and accordingly, the apparatus for verifying the operation state of an application is generally disposed in the server 105.

It should be noted that the server may be hardware or software. When the server is hardware, the server may be implemented as a distributed server cluster composed of multiple servers, or a single server may be implemented. When the server is software, it may be implemented as a plurality of software pieces or software modules (e.g., for providing distributed services), or it may be implemented as a single software piece or software module, which is not specifically limited herein.

It should be understood that the number of terminal devices, networks and servers in FIG. 1 is merely illustrative. There may be any number of terminal devices, networks, and servers as desired for implementation.

Figure 2:
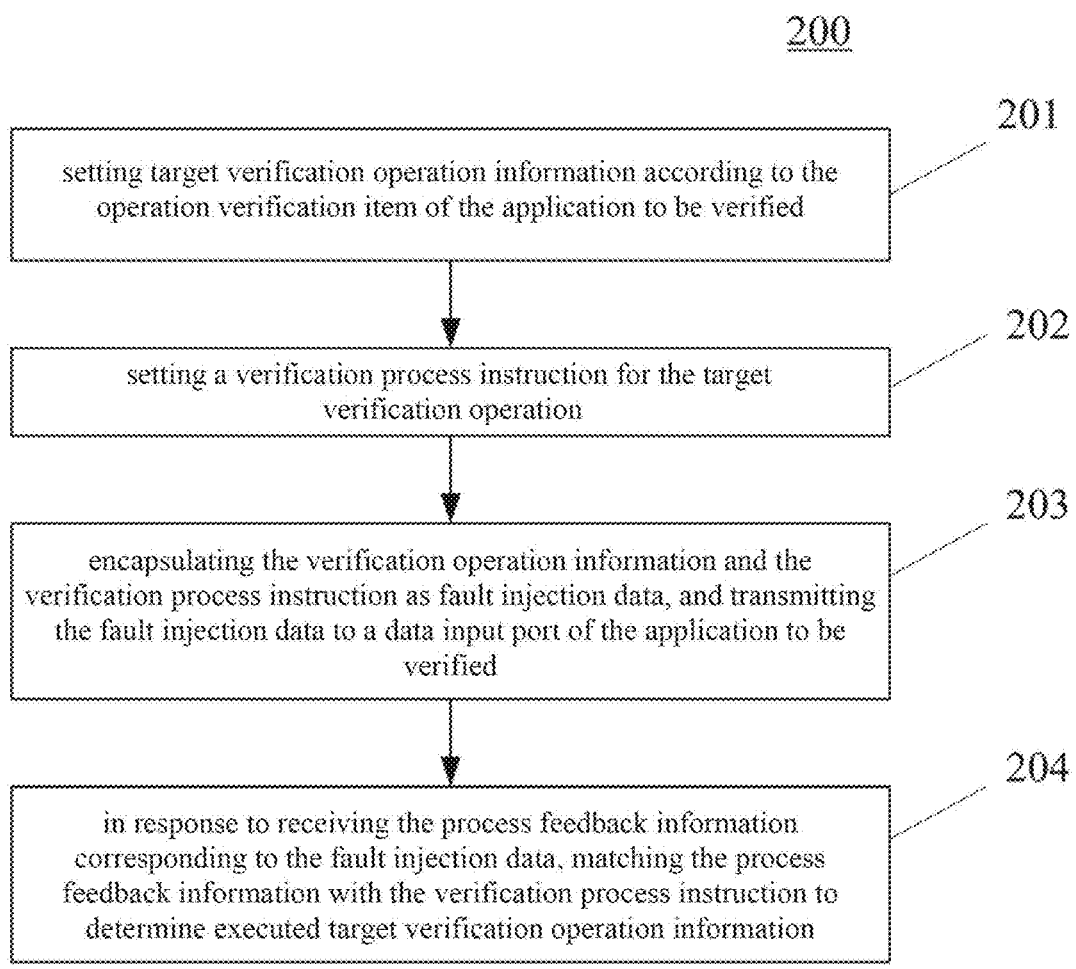
FIG. 2 is a schematic diagram of a second embodiment of the present disclosure.

With continuing reference to FIG. 2, a flow chart 200 of an embodiment of a method for verifying an operation state of an application in accordance with the present disclosure is shown. The method for verifying the operation state of an application includes the steps of S201 to S204.

Step 201 includes: setting target verification operation information according to the operation verification item of the application to be verified.

In the present embodiment, the execution body of the method for verifying the operation state of the application (for example, the server 105 shown in FIG. 1) may test the application to be verified on the terminal devices 101, 102, and 103 through a wired connection mode or a wireless connection mode. It should be noted that the above wireless connection methods may include, but are not limited to, a 3G/4G connection, a WiFi connection, a Bluetooth connection, a WiMAX connection, a Zigbee connection, a UWB (Ultra Wideband) connection, and other wireless connection methods now known or developed in the future.

Generally, when injecting application fault data in existing technology, a technician often needs to perform a test by means of a manual or a script or the like, which is time-consuming, error-prone, and generally incapable of performing a fault rehearsal step in parallel.

To this end, the execution body of some embodiments of the present disclosure may set the target verification operation information according to the operation verification item of the application to be verified. The operation verification item is used for testing corresponding components or functions of the application to be verified. As such, parallel testing of multiple components of an application or multiple applications to be verified can be implemented. The execution body may set the target verification operation information according to the operation verification item. The target verification operation information is data set according to operation verification item. For example, when the operation verification item is the redundancy of the application to be verified, the corresponding target verification operation information may be that the corresponding data or module in the application to be verified is faulty, thereby realizing the test of the redundancy of the application to be verified. Generally, multiple tests need to be performed for the application to be verified. Different operation verification items may have the same test or similar functions (that is, the functions of the target verification operation information for tests in different operation verification items may be the same). To this end, the execution body may set a verification operation identification for the target verification operation information to determine, through the verification operation identification, an operation verification item corresponding to the target verification operation information. That is, the target verification operation information may include a verification operation identification. The verification operation identification may be represented by a number, a character, or the like corresponding to the target verification operation information.

Step 202 includes: setting a verification process instruction for the target verification operation information.

When the to-be-verified application performs data processing on the target verification operation information, the to-be-verified application may have a fault such as a breakdown. In this case, the to-be-verified application may be unable to output the result information because the data processing of the target verification operation information is not completed, and it is difficult to determine the failing operation verification item of the to-be-verified application. To this end, the execution body may set a verification process instruction for the above-mentioned target verification operation information. The verification process instruction may be used by the to-be-verified application to return a verification operation identification and state information corresponding to the target verification operation information when performing data processing on the target verification operation information. The state information may be operation state data of the to-be-verified application when the target verification operation information is processed by the to-be-verified application.

Step 203 includes: encapsulating the verification operation information and the verification process instruction as fault injection data, and transmitting the fault injection data to a data input port of the application to be verified.

The execution body may encapsulate the verification operation information and the verification process instruction as the fault injection data, and the fault injection data may be used for testing the operation verification item of the to-be-verified application. Then, the execution body may send the fault injection data to the data input port of the application to be verified so that the application to be verified performs data processing on the fault injection data.

Step 204 includes: in response to receiving the process feedback information corresponding to the fault injection data, matching the process feedback information with the verification process instruction to determine executed target verification operation information.

After the execution body receives the process feedback information corresponding to the fault injection data from the data output port or other ports of the application to be verified, the execution body may match the process feedback information with the verification process instruction to determine executed target verification operation information. In this way, verification of the on-line operation state of the application to be verified can be realized.

Figure 3:
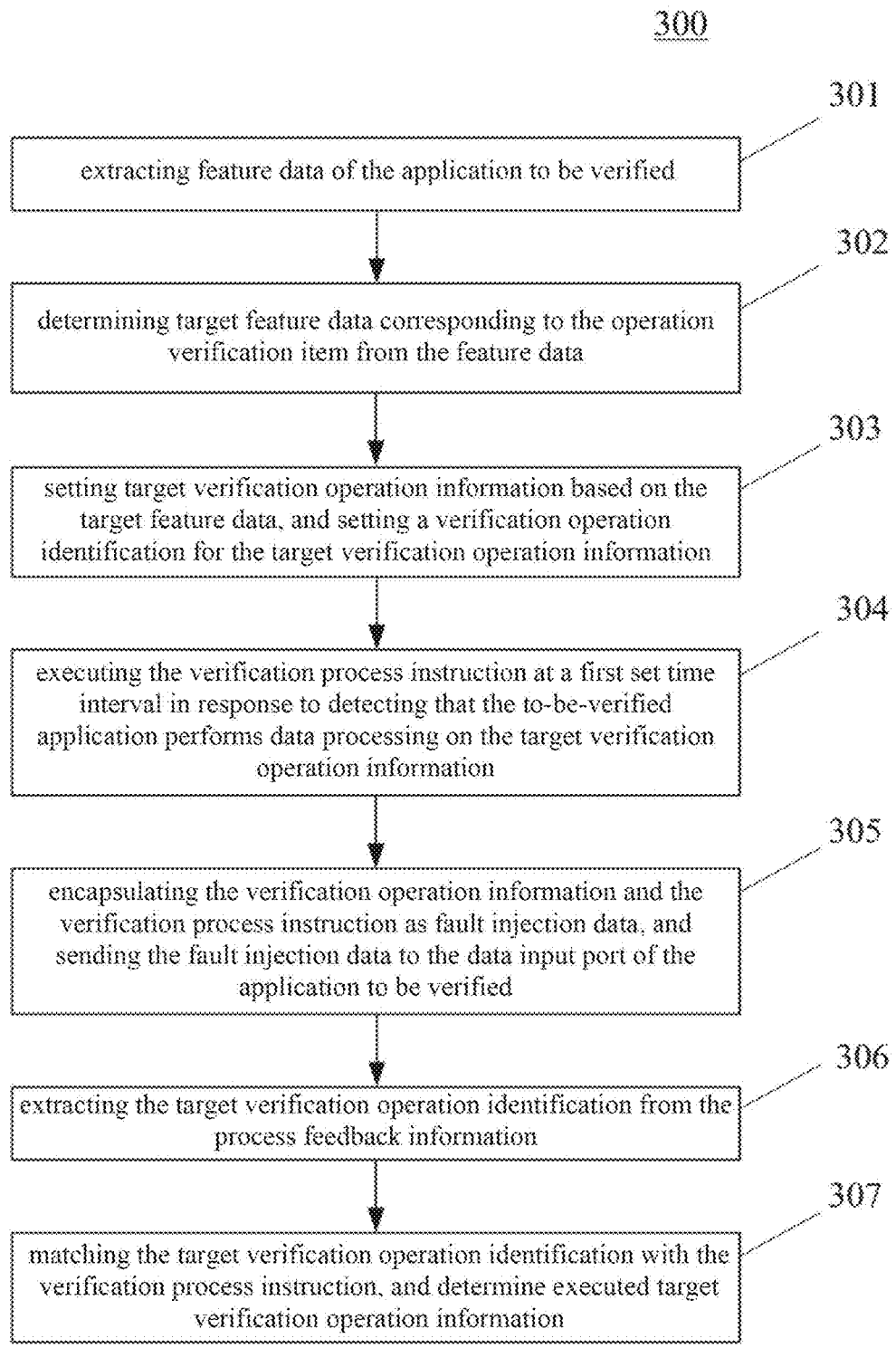
FIG. 3 is a schematic diagram of a third embodiment of the present disclosure.

With continuing reference to FIG. 3, a flow chart 300 of an embodiment of a method for verifying an operation state of an application in accordance with the present disclosure is shown. The method for verifying an operation state of an application includes the steps of 301 to 307.

Step 301 includes: extracting feature data of the application to be verified.

The execution body may extract the feature data from the application to be verified. The feature data may be used to represent a function of an application to be verified, a data processing type, and the like. The feature data may include at least one of a data processing module included in the application to be verified, a data transmission protocol of the application to be verified, and a data type of the application to be verified. The feature data may be different for different applications to be verified.

Step 302 includes: determining target feature data corresponding to the operation verification item from the feature data.

The feature data may contain a variety of information for the application to be verified. In order to verify the operation verification item, the execution body may determine the target feature data corresponding to the operation verification item from the feature data. The operation verification item may include at least one of security verification and fault verification. Accordingly, the target feature data may be feature data related to security or failure. For example, when the operation verification item is fault verification, the target feature data may be state information of multiple output ports set for a certain data, such that other output ports can normally output data when a certain output port fails.

Step 303 includes: setting target verification operation information based on the target feature data, and setting a verification operation identification for the target verification operation information.

After obtaining the target feature data, the execution body may set the target verification operation information for the target feature data, and set the verification operation identification for the target verification operation information. The target verification operation information includes at least one of delay data, error data, number of instruction requests, or an alarm signal. In this way, the correspondence between the operation verification item and the target verification operation information is established, thereby facilitating accurate verification and recognition of the operation verification item.

Step 304 includes executing the verification process instruction at a first set time interval in response to detecting that the to-be-verified application performs data processing on the target verification operation information.

The execution body may set a verification process instruction for the above-mentioned target verification operation information. Specifically, when it is detected that the above-mentioned to-be-verified application performs data processing on the target verification operation information, in order to acquire the operation state of the to-be-verified application when the to-be-verified application performs data processing on the target verification operation information, the execution body may execute the above-mentioned verification process instruction at a first set time interval to acquire the operation state information of the to-be-verified application after the to-be-verified application performs data processing on the target verification operation information. The value of the first setting time is generally short, for example, the first setting time may be 0.1 second or the like. The verification process instruction may be used to obtain state information of the to-be-verified application corresponding to the target verification operation information, and return the verification operation identification and state information. In this way, accurate state information of the to-be-verified application when the to-be-verified application performs data processing on the target verification operation information can be acquired.

Step 305 includes: encapsulating the verification operation information and the verification process instruction as fault injection data, and sending the fault injection data to the data input port of the application to be verified.

The content of step 305 is the same as that of step 203, and details are not described here.

Step 306 includes: extracting the target verification operation identification from the process feedback information.

The execution body may receive the process feedback information corresponding to the above-mentioned fault injection data from the data output port or other ports of the application to be verified. Thereafter, the execution body may extract the target verification operation identification from the process feedback information.

Step 307 includes: matching the target verification operation identification with the verification process instruction, and determine executed target verification operation information.

The target verification operation identification is returned when the relevant target verification operation information is processed by the to-be-verified application. The execution body may match the target verification operation identification with the verification process instruction, and may further determine executed target verification operation information. The verification of the operation state of the application to be verified can be realized.

Figure 4:
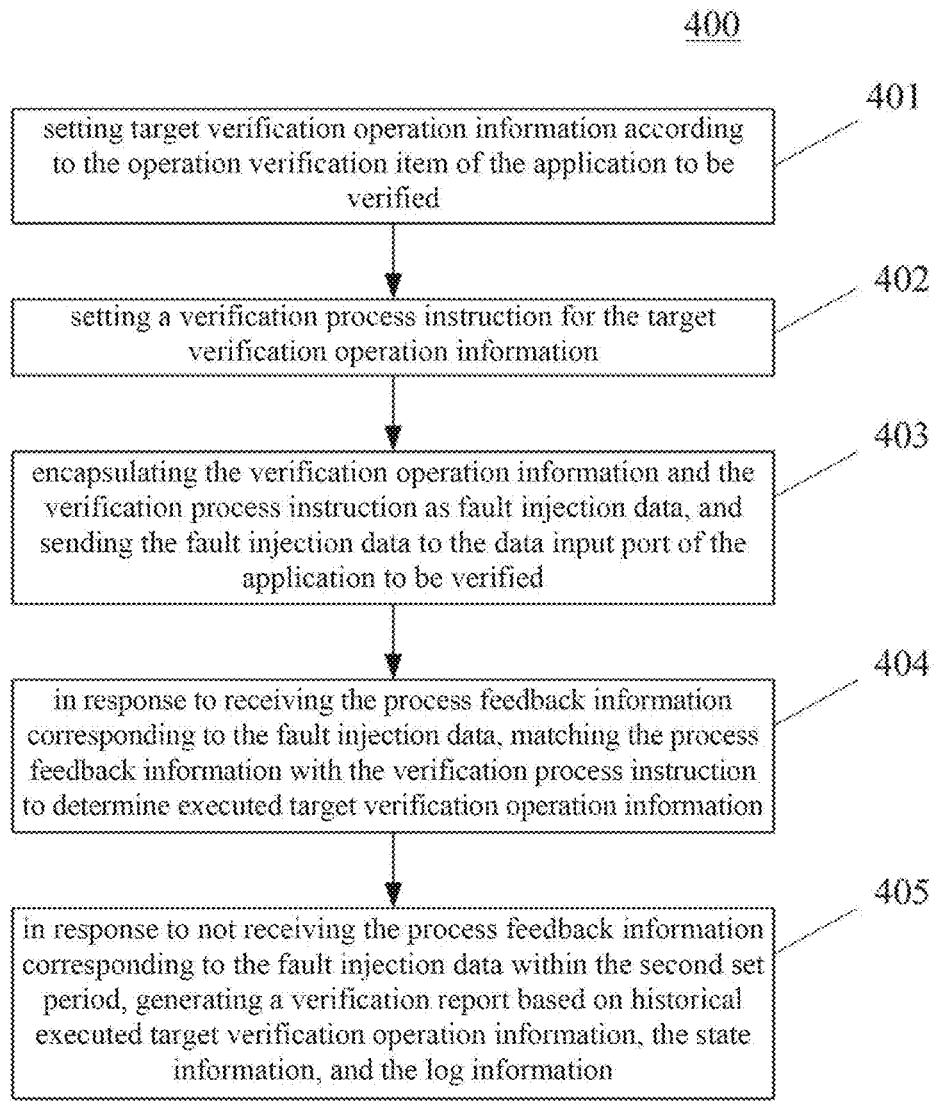
FIG. 4 is a schematic diagram of a fourth embodiment of the present disclosure.

With continuing reference to FIG. 4, a flow chart 400 of an embodiment of a method for verifying an operation state of an application in accordance with the present disclosure is shown. The method for verifying the operation state of an application includes the steps of 401 to 405.

Step 401 includes: setting target verification operation information according to the operation verification item of the application to be verified.

The content of step 401 is the same as that of step 201, and details are not described here.

Step 402 includes: setting a verification process instruction for the target verification operation information.

The content of step 402 is the same as that of step 202, and details are not described here.

Step 403 includes: encapsulating the verification operation information and the verification process instruction as fault injection data, and sending the fault injection data to the data input port of the application to be verified.

The content of step 403 is the same as that of step 203, and details are not described here.

Step 404 includes: in response to receiving the process feedback information corresponding to the fault injection data, matching the process feedback information with the verification process instruction to determine executed target verification operation information.

The content of step 404 is the same as that of step 204, and details are not described here.

Step 405 includes: in response to not receiving the process feedback information corresponding to the fault injection data within the second set period, generating a verification report based on historical executed target verification operation information, the state information, and the log information.

When the execution body does not receive the process feedback information corresponding to the above-mentioned fault injection data within the second set period, the to-be-verified application may have completed the data processing of the target verification operation information, or the process feedback information cannot be transmitted when a fault occurs in the data processing of the target verification operation information. In this case, the execution body may determine executed target verification operation information and the target verification operation information that has not been executed, based on the historical executed target verification operation information, the state information, and the log information. The log information is operation information recorded by the application to be verified. The process feedback information may include log information of the application to be verified. The execution body may then determine whether or not the operation verification item of the application to be verified is normal, or which operation verification item may have a fault, based on the state information corresponding to executed target verification operation information and the log information. For example, the historical executed target verification operation information corresponds to the operation verification item A, and the target verification operation information may be the number of instruction requests. The state information is when the target verification operation information is processed by the application to be verified, the application to be verified jumping from the set port A to the port A1. The log information shows that the application to be verified operates normally. It can be considered that the operation verification item A satisfy the normal operation of the application to be verified. When the historical executed target verification operation information corresponds to the operation verification item A, and the state information is when the target verification operation information is processed by the application to be verified, the application to be verified jumping from the set port A to the port A1. The log information shows that the application to be verified operates abnormally. It can be considered that the operation verification item A satisfies the normal operation of the application to be verified, and has good fault detection performance. When the historical executed target verification operation information corresponds to the operation verification item A, and the state information is that when the target verification operation information is processed by the application to be verified, the application to be verified can not jump from the set port A to the port A1. The log information shows that the application to be verified operates abnormally. Then, it can be considered that the operation verification item A cannot satisfy the normal operation of the application to be verified, and there is a potential fault in the operation verification item A. The execution body may generate a verification report based on the historical executed target verification operation information, the state information, and the log information, and the operation state analysis of the application to be verified is realized.

Figure 5:
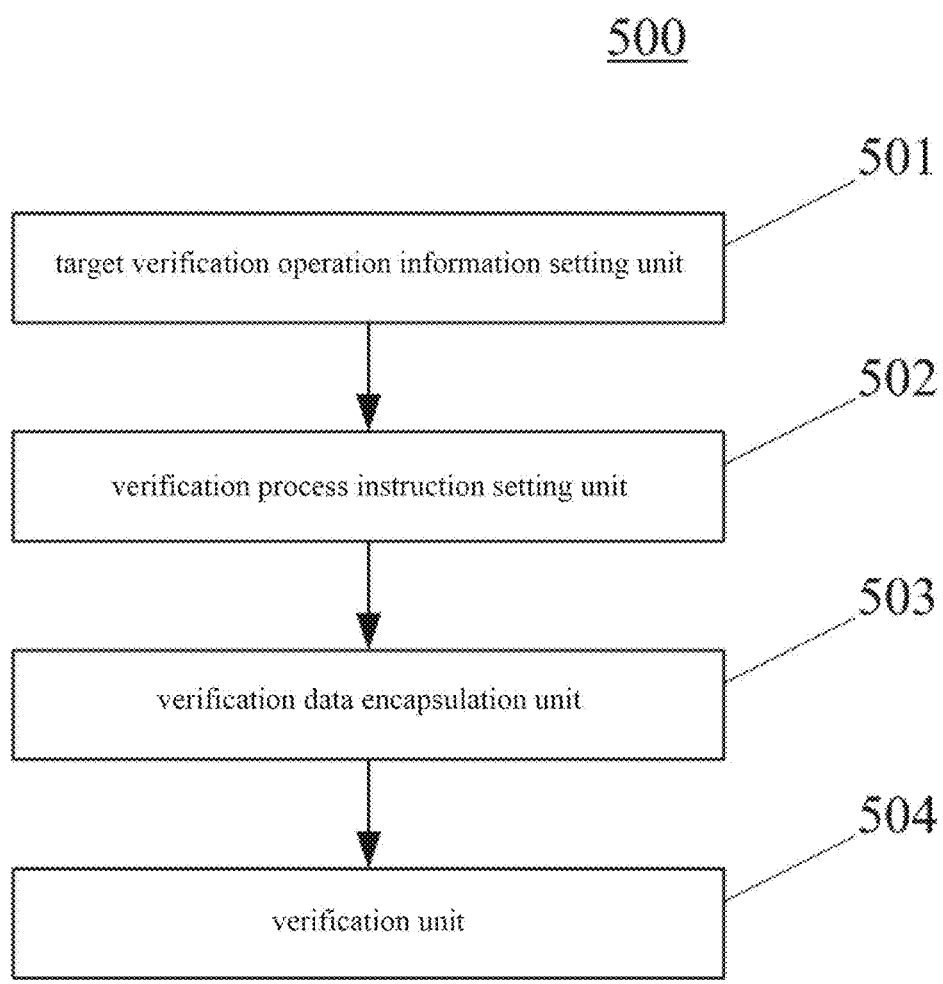
FIG. 5 is a block diagram of an electronic device for implementing a method for verifying an operation state of an application according to some embodiments of the present disclosure.

With further reference to FIG. 5, as an implementation of the method shown in above figures, the present disclosure provides an embodiment of an apparatus for verifying an operation state of an application, which corresponds to the method embodiment shown in FIG. 2, and which is particularly applicable to various electronic devices.

As shown in FIG. 5, the apparatus 500 for verifying an operation state of an application in some embodiments may include a target verification operation information setting unit 501, a verification process instruction setting unit 502, a verification data encapsulation unit 503, and a verification unit 504. The target verification operation information setting unit 501 is configured to set target verification operation information according to an operation verification item of an application to be verified, where the target verification operation information includes a verification operation identification; the verification process instruction setting unit 502 is configured to set a verification process instruction for the target verification operation information, where the verification process instruction is used to return a verification operation identification and state information corresponding to the target verification operation information when the to-be-verified application performs data processing on the target verification operation information; the verification data encapsulation unit 503 is configured to encapsulate the verification operation information and the verification process instruction as fault injection data and send the fault injection data to a data input port of the application to be verified; and the verification unit 504 is configured to match the process feedback information with the verification process instruction in response to receiving the process feedback information corresponding to the fault injection data, and determine executed target verification operation information.

In some alternative implementations of the present embodiment, the target verification operation information setting unit 501 may include a feature data extraction subunit (not shown in the figure), a target feature data determination subunit (not shown in the figure), and a target verification operation information setting subunit (not shown in the figure). The feature data extraction subunit is configured to extract feature data of the application to be verified, the feature data including at least one of: a data processing module included in the application to be verified, a data transmission protocol of the application to be verified, and a data type of the application to be verified; the target feature data determining subunit is configured to determine target feature data corresponding to the operation verification item from the feature data, the operation verification item including at least one of: security verification and fault verification; the target verification operation information setting subunit is configured to set target verification operation information based on the target feature data, and set a verification operation identification for the target verification operation information, the target verification operation information including at least one of delay data, error data, a number of instruction requests, and an alarm signal.

In some alternative implementations of the present embodiment, the verification process instruction setting unit 502 may include a verification process instruction setting subunit (not shown) configured to execute the verification process instruction at a first set time interval in response to detecting that the application to be verified performs data processing on the target verification operation information.

In some alternative implementations of the present embodiment, the verification unit 504 may include a target verification operation identification extraction subunit (not shown) and a target verification operation information determination subunit (not shown). The target verification operation identification extracting subunit is configured to extract the target verification operation identification from the process feedback information; and the target verification operation information determining subunit configured to match the target verification operation identification with a verification process instruction to determine executed target verification operation information.

In some alternative implementations of the present embodiment, the process feedback information includes log information of the application to be verified, and the apparatus 500 for verifying an operation state of an application may further include a verification report generating unit (not shown) configured to generate a verification report based on the historical executed target verification operation information, the state information, and the log information in response to not receiving the process feedback information corresponding to the fault injection data within a second set period.

According to an embodiment of the present disclosure, the present disclosure further provides an electronic device and a readable storage medium.

Figure 6:
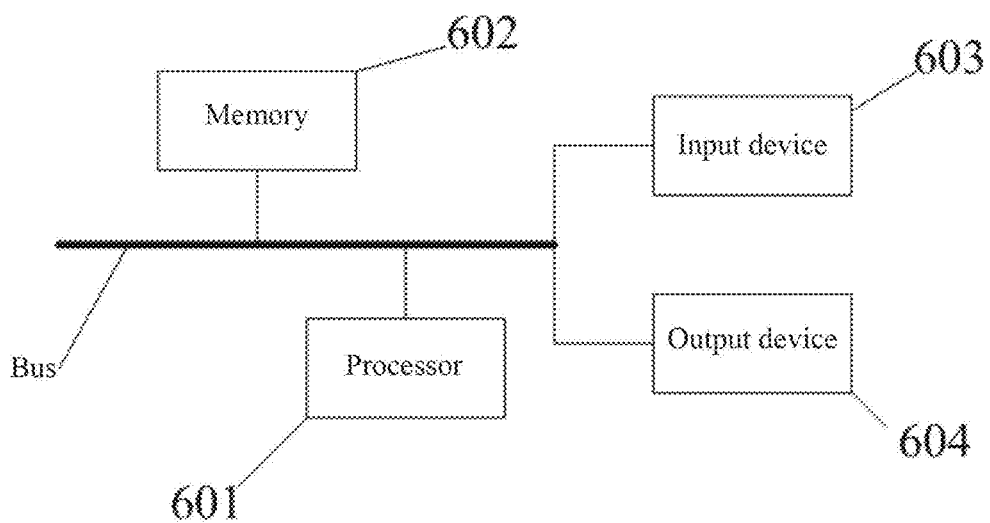
FIG. 6 is a schematic structural diagram of an electronic device adapted for implementing an embodiment of the present disclosure.

As shown in FIG. 6, FIG. 6 is a block diagram of an electronic device for verifying an operation state of an application according to some embodiments of the present disclosure. The electronic device is intended to represent various forms of digital computers, such as laptop computers, desktop computers, worktables, personal digital assistants, servers, blade servers, mainframe computers, and other suitable computers. The components shown herein, their connections and relationships, and their functions are merely examples only and are not intended to limit the implementation of the present disclosure as described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be mounted on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, processor 601 is used as an example.

The memory 602 is a non-transitory computer readable storage medium provided herein. The memory stores instructions executable by at least one processor to cause the at least one processor to perform the method for verifying the operation state of an application provided in some embodiments of the present disclosure. The non-transitory computer-readable storage medium of some embodiments of the present disclosure stores computer instructions for causing a computer to perform the method for verifying the state of operation of an application provided herein.

The memory 602, as a non-transitory computer readable storage medium, may be used to store non-transitory software programs, non-transitory computer executable programs and modules, such as program instructions/modules corresponding to the method for verifying the operation state of an application in some embodiments of the present disclosure (for example, the target verification operation information setting unit 501, the verification process instruction setting unit 502, the verification data encapsulation unit 503, and the verification unit 504 shown in FIG. 5). The processor 601 executes the non-transitory software programs, instructions, and modules stored in the memory 602 to execute various functional applications and data processing of the server, that is, to implement the method for verifying the operation state of the application in the method embodiment describe above.

The memory 602 may include a storage program area and a storage data area, where the storage program area may store an operating system, an application program required for at least one function; and the storage data area may store data or the like created according to the use of the electronic device for verifying the operation state of the application. In addition, memory 602 may include high speed random access memory, and may also include non-transitory memory, such as at least one magnetic disk storage device, flash memory device, or other non-transitory solid state storage device. In some embodiments, memory 602 may optionally include remotely disposed memory relative to processor 601, which may be connected via a network to an electronic device for verifying the state of operation of an application. Examples of such networks include, but are not limited to, the Internet, enterprise intranets, local area networks, mobile communication networks, and combinations thereof.

The electronic device for verifying the operation state of the application may further include input device 603 and output device 604. The processor 601, the memory 602, the input device 603, and the output device 604 may be connected via a bus or otherwise, as illustrated in FIG. 6.

The input device 603 may receive input number or character information, and generate key signal input related to user settings and functional control of the electronic device for verifying the operation state of the application, such as a touch screen, a keypad, a mouse, a track pad, a touch pad, a pointing stick, one or more mouse buttons, a trackball, a joystick, and the like. The output device 604 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that can be executed and/or interpreted on a programmable system including at least one programmable processor, which may be a dedicated or general purpose programmable processor, and may receive data and instructions from a storage system, at least one input device, and at least one output device, and transmit the data and instructions to the storage system, the at least one input device, and the at least one output device.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a backend component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such backend component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are generally remote from each other and usually interact through a communication network. The relationship between the client and the server is generated by a computer program running on the corresponding computer and having a client-server relationship with each other.

According to the technical solution of some embodiments of the present disclosure, the target verification operation information is first set according to the operation verification item of the application to be verified, so that the verification pertinence is improved; then a verification process instruction for the target verification operation information is set to facilitate determination of a detection process; then the verification operation information and the verification process instruction are encapsulated as fault injection data, and the fault injection data is sent to a data input port of the application to be verified; finally, in response to receiving the process feedback information corresponding to the fault injection data, the process feedback information is matched with the verification process instruction to determine executed target verification operation information. The application can detect the operation state of the to-be-verified application after executing the target verification operation, which is beneficial to improving the on-line operation stability of the to-be-verified application.

It should be understood that the various forms of processes shown above may be used to reorder, add, or delete steps. For example, the steps described in some embodiments of the present disclosure may be performed in parallel, sequentially, or in different orders. As long as the desired results of the technical solution disclosed in some embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for verifying an operation state of an application, comprising:
   setting target verification operation information of an application to be verified according to an operation verification item of the application to be verified, the target verification operation information comprising a verification operation identification, wherein the application to be verified is installed in a client computer;
   setting a verification process instruction for the target verification operation information, wherein the verification process instruction is used for returning the verification operation identification and state information corresponding to the target verification operation information when the application to be verified performs data processing on the target verification operation information, wherein the state information is operation state data of the application to be verified when the target verification operation information is processed by the application to be verified, and comprises state information of multiple output ports of the application to be verified;
   encapsulating the verification operation information and the verification process instruction as fault injection data, and sending the fault injection data to a data input port of the application to be verified;
   in response to receiving process feedback information corresponding to the fault injection data, matching the process feedback information with the verification process instruction to determine executed target verification operation information, wherein the process feedback information comprises log information of the application to be verified; and
   in response to not receiving the process feedback information corresponding to the fault injection data within a second set period, generating a verification report based on historical executed target verification operation information, the state information, and the log information, wherein the generating the verification report comprises: detecting operation states of the output ports of the application to be verified when the target verification operation information is executed by the application to be verified, and determining an operation stability of the application to be verified based on the operation states of the output ports;
   wherein the method is performed by a server coupled to the client computer and a computer network.

2. The method according to claim 1, wherein the setting target verification operation information according to an operation verification item of an application to be verified comprises:
   extracting feature data of the application to be verified, wherein the feature data comprises at least one of a data processing module included in the application to be verified, a data transmission protocol of the application to be verified, or a data type of the application to be verified;
   determining target feature data corresponding to the operation verification item from the feature data, the operation verification item comprising at least one of security verification or fault verification; and
   setting target verification operation information according to the target feature data, and setting a verification operation identification for the target verification operation information, the target verification operation information comprising at least one of delay data, error data, a number of instruction requests, or an alarm signal.

3. The method according to claim 1, wherein the setting a verification process instruction for the target verification operation information comprises:
  executing the verification process instruction at a first set time interval in response to detecting that the application to be verified performs data processing on the target verification operation information.

4. The method according to claim 1, wherein the matching the process feedback information with a verification process instruction to determine executed target verification operation information comprises:
  extracting a target verification operation identification from the process feedback information; and
  matching the target verification operation identification with the verification process instruction, and determining the executed target verification operation information.

5. The method according to claim 1, wherein the state information of multiple output ports comprises information that the application to be verified jumps from a first output port to a second output port.

6. An electronic device comprising:
  one or more processors;
  a memory storing one or more programs, wherein the one or more programs when executed by the one or more processors cause the one or more processors to perform operations, the operations comprising:
  setting target verification operation information of an application to be verified according to an operation verification item of the application to be verified, the target verification operation information comprising a verification operation identification, wherein the application to be verified in installed in a client computer;
  setting a verification process instruction for the target verification operation information, wherein the verification process instruction is used for returning the verification operation identification and state information corresponding to the target verification operation information when the application to be verified performs data processing on the target verification operation information, wherein the state information is operation state data of the application to be verified when the target verification operation information is processed by the application to be verified, and comprises state information of multiple output ports of the application to be verified;
  encapsulating the verification operation information and the verification process instruction as fault injection data, and sending the fault injection data to a data input port of the application to be verified;
  in response to receiving process feedback information corresponding to the fault injection data, matching the process feedback information with the verification process instruction to determine executed target verification operation information, wherein the electronic device is coupled to the client computer and a computer network, wherein the process feedback information comprises log information of the application to be verified; and
  in response to not receiving the process feedback information corresponding to the fault injection data within a second set period, generating a verification report based on historical executed target verification operation information, the state information, and the log information, wherein the generating the verification report comprises: detecting operation states of the output ports of the application to be verified when the target verification operation information is executed by the application to be verified, and determining an operation stability of the application to be verified based on the operation states of the output ports.

7. The electronic device according to claim 6, wherein the setting target verification operation information according to an operation verification item of an application to be verified comprises:
  extracting feature data of the application to be verified, wherein the feature data comprises at least one of a data processing module included in the application to be verified, a data transmission protocol of the application to be verified, or a data type of the application to be verified;
  determining target feature data corresponding to the operation verification item from the feature data, the operation verification item comprising at least one of security verification or fault verification; and
  setting target verification operation information according to the target feature data, and setting a verification operation identification for the target verification operation information, the target verification operation information comprising at least one of delay data, error data, a number of instruction requests, or an alarm signal.

8. The electronic device according to claim 6, wherein the setting a verification process instruction for the target verification operation information comprises:
  executing the verification process instruction at a first set time interval in response to detecting that the application to be verified performs data processing on the target verification operation information.

9. The electronic device according to claim 6, wherein the matching the process feedback information with a verification process instruction to determine executed target verification operation information comprises:
  extracting a target verification operation identification from the process feedback information; and
  matching the target verification operation identification with the verification process instruction, and determining the executed target verification operation information.

10. A non-transitory computer readable medium storing a computer program which, when executed by a processor of a server, causes the processor to perform operations, the operations comprising:
  setting target verification operation information of an application to be verified according to an operation verification item of the application to be verified, the target verification operation information comprising a verification operation identification, wherein the application to be verified is installed in a client computer;
  setting a verification process instruction for the target verification operation information, wherein the verification process instruction is used for returning the verification operation identification and state information corresponding to the target verification operation information when the application to be verified performs data processing on the target verification operation information, wherein the state information is operation state data of the application to be verified when the target verification operation information is processed by the application to be verified, and comprises state information of multiple output ports of the application to be verified;
  encapsulating the verification operation information and the verification process instruction as fault injection data, and sending the fault injection data to a data input port of the application to be verified;

in response to receiving process feedback information corresponding to the fault injection data, matching the process feedback information with the verification process instruction to determine executed target verification operation information, wherein the server is coupled to the client computer and a computer network, wherein the process feedback information comprises log information of the application to be verified; and in response to not receiving the process feedback information corresponding to the fault injection data within a second set period, generating a verification report based on historical executed target verification operation information, the state information, and the log information, wherein the generating the verification report comprises: detecting operation states of the output ports of the application to be verified when the target verification operation information is executed by the application to be verified, and determining an operation stability of the application to be verified based on the operation states of the output ports.

11. The computer readable medium according to claim 10, wherein the setting target verification operation information according to an operation verification item of an application to be verified comprises:

extracting feature data of the application to be verified, wherein the feature data comprises at least one of a data processing module included in the application to be verified, a data transmission protocol of the application to be verified, or a data type of the application to be verified;

determining target feature data corresponding to the operation verification item from the feature data, the operation verification item comprising at least one of security verification or fault verification; and setting target verification operation information according to the target feature data, and setting a verification operation identification for the target verification operation information, the target verification operation information comprising at least one of delay data, error data, a number of instruction requests, or an alarm signal.

12. The computer readable medium according to claim 10, wherein the setting a verification process instruction for the target verification operation information comprises:

executing the verification process instruction at a first set time interval in response to detecting that the application to be verified performs data processing on the target verification operation information.

13. The computer readable medium according to claim 10, wherein the matching the process feedback information with a verification process instruction to determine executed target verification operation information comprises:

extracting a target verification operation identification from the process feedback information; and matching the target verification operation identification with the verification process instruction, and determining the executed target verification operation information.

* * * * *